Oct. 4, 1932.  J. GRAY  1,880,386
BAKER'S BENCH
Filed Aug. 29, 1931
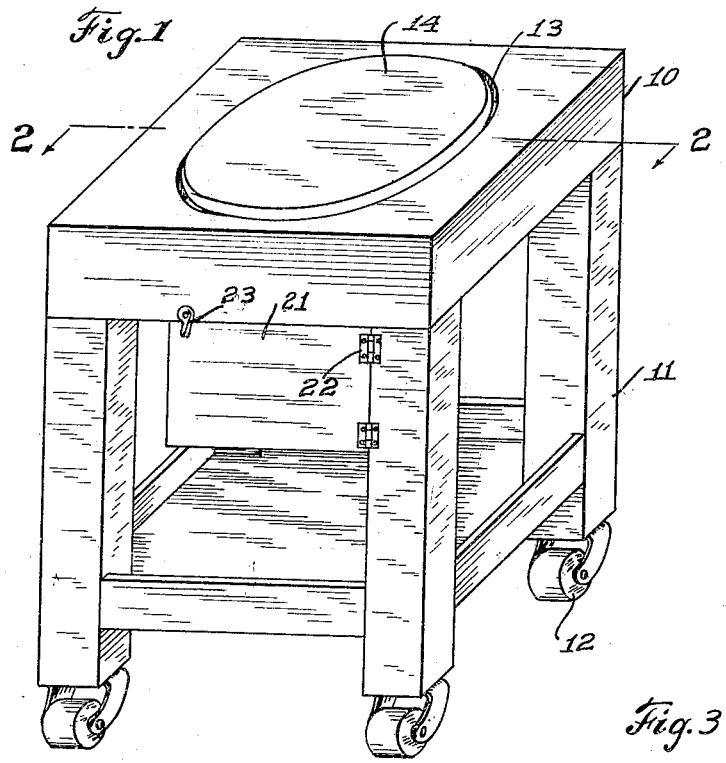
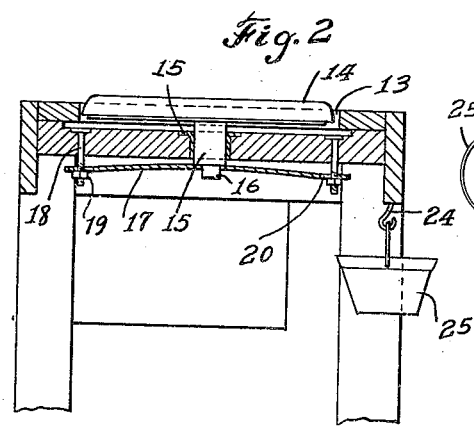
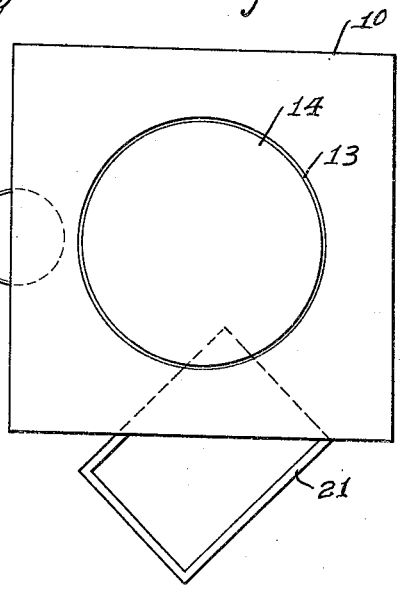
INVENTOR
Joseph Gray Patented Oct. 4, 1932

1,880,386

UNITED STATES PATENT OFFICE

JOSEPH GRAY, OF BROOKLYN, NEW YORK

BAKER'S BENCH

Application filed August 29, 1931. Serial No. 560,065.

This invention relates to improvements in baker's work benches, and it is the principal object of my invention to provide a work bench allowing a thorough working of the dough from all angles without the baker leaving or changing his place in front of the bench.

Another object of my invention is the provision of a baker's bench including a spring supported rotatable platform having its supporting spring provided with slots to allow a stretching of the spring under heavy loads without interference with its fastening means.

A further object of my invention is the provision of a baker's work bench of simple and inexpensive construction, yet durable and efficient in use.

A still further object of my invention is the provision of a baker's bench equipped with handy flour and water containers.

These and other objects and advantages of my invention will become more fully known as the description thereof proceeds, and will then be specifically defined in the appended claims.

In the accompanying drawing forming a material part of this disclosure:

Fig. 1 is a perspective view of a baker's bench constructed according to my invention.

Fig. 2 is a fragmentary sectional view of the bench, the section being taken on line 2—2 of Figure 1.

Fig. 3 is a top plan view of the bench.

As illustrated, the bench 10 supported by legs 11 on casters 12 has a central opening 13 in its top plate in which a platform or table 14 is rotatably arranged on a median, depending stem 15, rotating within a socket 15'.

The reduced lower end 16 of the stem passes through the middle of a transversely arranged leaf spring 17, held in position by means of the bolts 18 and nuts 19 thereon.

The bolts 18 pass through elongated slots 20 near the outer ends of the spring so as to allow a stretching of the spring which normally with its upwardly curved middle part engages a shoulder formed on stem 15 by its reduced part 16, under an increasing load.

A box 21 for the reception of flour is hingedly connected at one edge, as at 22, to one of the legs of the bench so that its contents can readily be reached by the baker during his work on the dough by swinging out the box as indicated in Figure 3, while in its position of rest the box is held out of the way by means of the latch 23.

Depending from the lower edge of the top plate of bench 10 is a hook 24 from which is suspended a vessel 25 containing the necessary water for the dough.

In use, the baker places a container with the dough to be worked upon the central platform or table 14 and he can then readily turn the dough container and platform to bring successively all parts of the dough to be worked upon in front of his position so that the dough can be thoroughly worked from all angles without it being necessary for the baker to leave his place. It will be clear that flour and water are always handy within easy reach of the baker. If a heavy load is placed on table 14, the spring 17 will stretch to assume horizontal position and the slots in the spring ends will make allowance for this expansion without interference by the bolts 18.

It will be evident that I can make changes in my device as come within the scope of the appended claims without departure from the spirit of my invention.

Having thus described my invention, what I claim as new and desire to secure by Letters Patent is:

1. A baker's bench comprising a table having a central opening, a platform forming a support for a dough receptacle rotatably arranged in said opening, yielding means supporting said platform, means for compensating differences in the load placed on said platform, means for bringing flour within convenient reach of the baker, and a water container suspended from the bench.

2. A baker's work bench comprising a table supported by legs equipped with casters and having a central opening formed in its top, a platform forming a support for a dough receptacle rotatably arranged in said opening slightly above the table top, a depending stem on said platform, a spring supporting said stem in its middle, means for compensating for the differences in load of the dough receptacle, and a flour and water receptacle on said bench within easy reach of the baker.

3. A baker's work bench comprising a table having a median opening, a platform rotatably arranged in said opening, a depending stem on said platform having a reduced end forming a shoulder, a leaf spring transversely arranged under said table through which the reduced end of the stem extends in approximately its middle, said spring engaging the shoulder, and having elongated slots near its outer ends, and means for suspending said spring from the bench passing with play through said slots.

4. The combination of a baker's bench with a rotatable platform, an upwardly curved leaf spring supporting said platform and having elongated slots near its ends, bolts depending from said bench and passing with play through these slots, nuts at the lower ends of said bolts, and a socket in said bench for a stem of said platform, allowing its rotation.

Signed at New York in the county of New York and State of New York this 15th day of August A. D. 1931.

JOSEPH GRAY.